Figure 1:
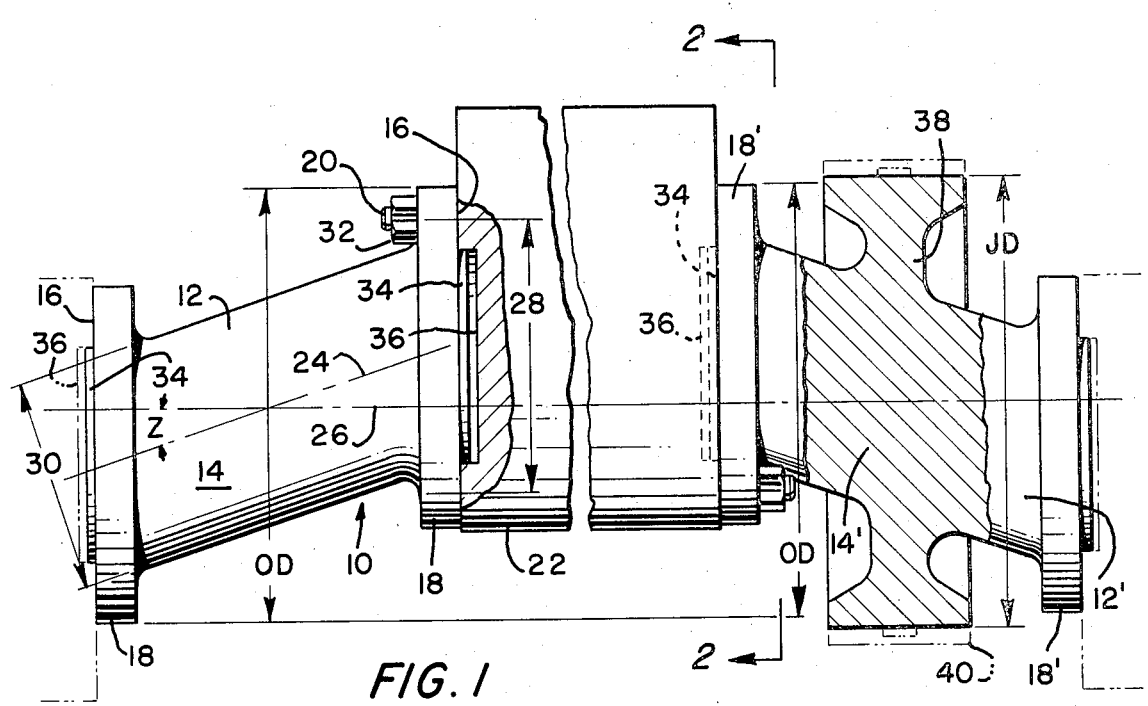

United States Patent
Black

[11] 3,808,911
[45] May 7, 1974

[54] COUPLING MEANS
[75] Inventor: Arthur L. Black, Corning, N.Y.
[73] Assignee: Ingersoll-Rand Company, Woodcliff Lake, N.J.
[22] Filed: Aug. 1, 1973
[21] Appl. No.: 384,448

[52] U.S. Cl. .............................................. 74/597
[51] Int. Cl. ............................................. F16c 3/12
[58] Field of Search ............ 74/598, 597, 595, 570, 74/567; 123/197 AC

[56] References Cited
UNITED STATES PATENTS
| | | | |
|---|---|---|---|
| 188,138 | 3/1877 | Houston | 74/598 |
| 1,599,306 | 9/1926 | Walker | 74/597 |

*Primary Examiner*—Benjamin W. Wyche
*Assistant Examiner*—F. D. Shoemaker
*Attorney, Agent, or Firm*—Bernard J. Murphy; David W. Tibbott

[57] ABSTRACT

The means comprises a shaft having parallel mounting faces at opposite ends thereof for coupling eccentrically-rotatable elements for rotation about a common axis, wherein the body of the shaft has a longitudinal centerline which lies oblique to the common axis. The shaft has mounting flanges at each end which have rotatable element mounting bolt holes formed therein defining a bolt hole circle of a diameter which is between one-fourth and one-third larger than the nominal diameter of the shaft body.

9 Claims, 2 Drawing Figures

COUPLING MEANS

This invention pertains to means for coupling eccentrically-rotatable elements about a common axis of rotation, and in particular to such coupling means which readily facilitate disassembly thereof.

It is already known from prior art practices to define coupling means, for offset elements and the like, which are "built up." Particularly, from U.S. Pat. Nos. 2,324,373 and 2,331,541, issued July 13, 1943 and Oct. 12, 1943 for Crankshafts, by Julius Dusevoir, it is well known to form crankshafts, for internal combustion, piston-type, engines, from individual components therefor. However, in the typical practices, as exemplified by the cited patents, the coupling hardware, i.e., the through bolts or machine screws which utilize the crankshafts are quite inaccessible. Thus, it is almost always necessary, during maintenance or rebuild, to remove the entire crankshaft in order that individual components might be replaced. Also, according to the earlier practices, as advanced by Patentee Dusevoir, the curvic interface/coupling arrangement, using fine, linear or arcuate serrations between engaging surfaces, can withstand only light torque loading and, accordingly, a crankshaft built up according to this practice is prey to fretting. It has been found that crankshafts or mainshafts in rotary combustion engines have a greater torque loading than curvic interfaces and single, axially-disposed through bolts and machine screws can carry.

It is an object of this invention, therefor, to set forth an improved coupling means for a mainshaft; particularly it is an object of this disclosure to define means for coupling components of a built-up mainshaft for use, particularly, in rotary combustion engines although the invention is not intended to be limited to such an application.

As used in this specification, the term "mainshaft" relates to that element in a rotary engine (or compressor) for which, in typical piston-type engines, the crankshaft is its complement. However, a mainshaft in a rotary combustion engine (or compressor) is that which carries the eccentrically-rotatable rotor journals. For purposes of illustration, I set forth my invention in connection with coupling means for the build-up of such a mainshaft. Yet, broadly it is an object of this invention to teach means for coupling first and second eccentrically-rotatable elements, which have offset throws, for rotation about a common axis, comprising a shaft; said shaft having a body with mounting faces at opposite ends thereof; wherein said faces are parallel, and are perpendicular to the common axis; and said body has a longitudinal centerline, extending between said faces, which transverses the common axis at an oblique angle.

A feature of this invention comprises a shaft having parallel mounting faces at opposite ends thereof for coupling eccentrically-rotatable elements for rotation about a common axis, wherein the body of the shaft has a longitudinal centerline which lies oblique to the common axis. The shaft has mounting flanges at each end which have rotatable element mounting bolt holes formed therein defining a bolt hole circle of a diameter which is between one-fourth and one-third larger than the nominal diameter of the shaft body.

Figure 2:
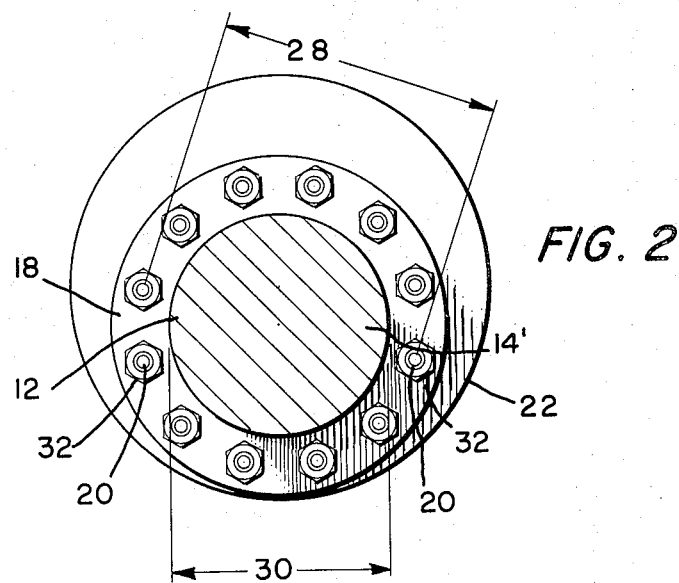

Further objects and features of this invention will become more apparent by reference to the following description taken in conjunction with the accompanying figures, in which FIG. 1 is an axially-disposed illustration of a mainshaft, carrying pluralities of rotor journals, formed of separable elements in accord with an embodiment of the invention; and FIG. 2 is a cross-sectional view of the mainshaft of FIG. 1, taken along section 2—2 of FIG. 1.

As shown in the figures, the coupling means 10 comprises a shaft 12 having a body 14 which has coupling faces 16 formed on opposite ends thereof. The faces 16 are defined on outermost surfaces of terminal mounting flanges 18 formed on shaft 12. The flanges 18 are bored through for receiving studs 20, extending from a rotor journal 22. The shaft body 14 has a longitudinal centerline 24 which traverses the rotary axis 26 of the mainshaft at an oblique angle "Z." The flanges have a bolt hole circle diameter 28 which is more than one-fourth greater than the nominal diameter 30 of the shaft body 14, and is substantially one-third greater. Diameter 30 is approximately 152 mm., and diameter 28 is approximately 204 mm. Accordingly, such a bolt periphery about the shaft 12 accomplishes a heavy torque transmission.

Bolt wrenching heads, or nuts 32 fastened to studs 20 as shown in the embodiment, are externally exposed and readily accessible, to facilitate disassembly of the mainshaft. This is vitally important in rotary combustion engine or compressor structures, where the rotors and journals, typically, are confined between intervening walls.

Further, to enable correct alignment and rebuild, the shaft 14 has circular, locating stubs 34 formed thereon which extend outwardly from the mounting faces 16. These are provided for nesting thereof in complementary locating recesses 36 in rotor journals 22.

Shaft 12', shown at the right in FIG. 1, is identical to shaft 12 in all respects, except that the body 14' thereof has an annular web 38 which, about the periphery thereof, defines a bearing journal 40.

It will be noted that the diameter of the flange 18 which is adjacent to journal 40 is of smaller dimension then the latter. Accordingly, it is with little or no difficulty that shaft 12' can be withdrawn through a bearing shell retained within an equipment housing. More importantly, it will be seen that a large, whole (i.e., non-split) bearing can be deployed about journal 40.

While I have described my invention in connection with a specific embodiment thereof, it is to be clearly understood that this is done only by way of example and not as a limitation to the scope of my invention as set forth in the objects thereof and in the appended claims. For example, the embodiment shown teaches means for coupling flanges 18 which are opposed, or 180° apart. This, of course, is immaterial. The invention is applicable to other configurations wherein such flanges may be offset by any suitable angle. What is important is for the flange offset diameter "JD," in FIG. 1, to be less than the journal diameter "OD." Thus may a whole, non-split bearing be emplaced in an intermediate housing, or the like, in a rotary engine or compressor, to receive a shaft 12'—with its offset flanges 18—with ease and facility.

I claim:

1. Means for coupling first and second eccentrically-rotatable elements, for rotation about an common axis, with offset throws comprising:

a shaft;

said shaft having a body with mounting faces at opposite ends thereof; wherein said faces are parallel, and are perpendicular to the common axis; and said body has a longitudinal centerline, extending between said faces, which transverses the common axis at an oblique angle.

2. Coupling means, according to claim 1, wherein:

said shaft has circular mounting flanges at opposite ends thereof;

said flanges each having a surface which defines one of said mounting faces; and said flanges have a plurality of bolt holes formed therethrough for receiving fasteners for securing one of the eccentrically-rotatable elements thereto.

3. Coupling means, according to claim 2, wherein:

said shaft further has a circular, locating stubs extending outwardly from said faces for insertion into locating recesses therefor, in, and where the latter are formed in, couplable eccentrically-rotatable elements.

4. Coupling means, according to claim 3, wherein:

each of said stubs has an outside diameter which is smaller than the outside diameter of said flanges.

5. Coupling means, according to claim 2, further including:

a bearing journal fixed on said shaft intermediate said flanges.

6. Coupling means, according to claim 2, wherein:

said body has a given diameter, relative to said longitudinal centerline; and said bolt holes in each of said flanges define bolt hole circle diameters which are not less than one-fourth greater then said given diameter.

7. Coupling means, according to claim 6, wherein:

said bolt hole circular diameters are substantially one-third greater than said given diameter.

8. Coupling means, according to claim 5, wherein:

said journal has an outside diameter which is greater than the outside diameters of said flanges.

9. Coupling means, according to claim 5, wherein:

said flanges cooperate to define an offset diameter, relative to said common axis; and said bearing journal has an outside diameter which is of greater dimension than said offset diameter.

10. Means for coupling first and second eccentrically-rotatable elements for rotation about an common axis offset throws, comprising:

a shaft, said shaft having a body with at least one mounting face at one opposite end thereof; wherein said face is perpendicular to the common axis; and said body has a longitudinal centerline, extending between said opposite ends, which transverses the common axis at an oblique angle.

* * * * *